US007383326B1

(12) United States Patent
Himberger et al.

(10) Patent No.: US 7,383,326 B1
(45) Date of Patent: Jun. 3, 2008

(54) METHODS AND COMPUTER SYSTEMS FOR DIRECTING A CLIENT TO NETWORK LOCATIONS FOR NETWORK HOSTED SERVICES

(75) Inventors: Andrew M. Himberger, Redmond, WA (US); Marcin D. Szuster, Bellevue, WA (US); Tracey M. Gauthier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/310,324

(22) Filed: Dec. 5, 2002

(51) Int. Cl.
*G06F 15/177* (2006.01)

(52) U.S. Cl. ............... 709/220; 709/203; 709/217; 709/219; 709/223; 709/245; 717/169; 717/170; 717/171; 717/172; 717/173

(58) Field of Classification Search ............ 709/203, 709/217–220, 223, 238, 245–246; 717/169–173
See application file for complete search history.

(56) References Cited

U.S. PATENT DOCUMENTS

| 6,009,459 | A  | * | 12/1999 | Belfiore et al. ............. 709/203 |
| 6,041,360 | A  | * | 3/2000  | Himmel et al. ............. 709/245 |
| 6,074,434 | A  | * | 6/2000  | Cole et al. ................ 717/173 |
| 6,421,733 | B1 | * | 7/2002  | Tso et al. ................. 709/246 |
| 6,981,210 | B2 | * | 12/2005 | Peters et al. ............... 715/511 |
| 7,089,284 | B2 | * | 8/2006  | Pardikar et al. ............ 709/203 |
| 7,150,037 | B2 | * | 12/2006 | Wolf et al. .................. 726/6 |
| 2004/0117456 | A1 | * | 6/2004 | Brooks ..................... 709/217 |
| 2004/0117466 | A1 | * | 6/2004 | Bodin et al. ............... 709/222 |

OTHER PUBLICATIONS

Z. Genova and K. J. Christensen, "Using Signatures To Improve URL Routing," Conference Proceedings of the 2002 IEEE International Performance, Computing, and Communications Conference, Phoenix, Arizona, Apr. 35, 2002, p. 45-52.

B. Krishnamurthy, C. Wills, Y. Zhang, "On The Use and Performance of Content Distribution Networks," *Computer Communication Review*, Internet Measurement Workshop, Proceedings of the First ACM SIGCOMM Internet Measurement Workshop, IMW 2001, vol. 32, No. 1, Nov. 1-2, 2001, p. 169182.

(Continued)

*Primary Examiner*—Saleh Najjar
*Assistant Examiner*—Shawki S Ismail
(74) *Attorney, Agent, or Firm*—Merchant & Gould P.C.; Ryan T. Grace (57) ABSTRACT

Methods, computer systems, and computer readable media provide for network location overrides for a client to utilize when accessing network hosted services. A client computer obtains network locations for hosted services from a network location, such as a URL of a configuration server. Any overrides providing different network locations for one or more of the hosted services are obtained from a store of the client computer, such as from a system registry provided by the operating system. The network location of an override is then used in place of a network location specified at the configuration server to access the hosted service. The overrides may apply for all applications, certain applications, certain services of an application, or for certain users of the client computer.

16 Claims, 5 Drawing Sheets

OTHER PUBLICATIONS

G. Narlikar, Y.N. Lakshaman, T. Ho, "TaBLA: A Client-Based Scheduling Algorithm for Web Proxy Clusters," Bell Laboratories, Lucent Technologies, 2001 IEEE International Performance, Computing, and Communications Conference, Phoenix, Arizona, Apr. 4-6, 2001, p. 217, 227.

K. Bharat, A. Broder, J. Dean, M. Henzinger, "A Comparison of Techniques to Find Mirrored Hosts On The WWW," *Journal of the American Society for Information Science*, vol. 51, No. 12, Oct. 2000, p. 1114-1122.

V. Cardellini, M. Colajanni, P. Yu, "Redirection Algorithms for Load Sharing in Distributed WebServer Systems," Proceedings 19th IEEE International Conference on Distributed Computing Systems, Sponsored by IEEE Computer Society Technical Committee on Distributed Processing, May 31-Jun. 4, 1999, p. 528-535.

C. Yoshikawa, B. Chun, P. Eastham, A. Vahdat, T. Anderson, and D. Culler, "Using Smart Clients To Build Scalable Services," Proceedings of the USENIX 1997 Annual Technical Conference, Anaheim, California Jan. 6-10, 1997, p. 105-117.

A. Warnock, III, J. M. Fullton, "*The Electronic Astrophysical Journal*: Resource Location and Archive Management," Astronomical Society of the Pacific Conference Series, vol. 101, Oct. 23-25, 1995, p. 589-92.

P. Kougiouris, "ASP.NET, Intercept, Monitor, and Modify Web Requests with HTTP Filters in ISAPI and ASP.NET," *MSDN Magazine*, vol. 17, No. 8, Aug. 2002, p. 46-50.

\* cited by examiner

METHODS AND COMPUTER SYSTEMS FOR DIRECTING A CLIENT TO NETWORK LOCATIONS FOR NETWORK HOSTED SERVICES

TECHNICAL FIELD

The present invention is related to accessing network provided services by a client computer. More particularly, the present invention is related to the direction of the client computer to network locations providing the services.

BACKGROUND

Client computers execute application programs that provide various functionality. However, services of the application programs may be provided from a network that the client computer has access to. Decoupling the services from the client computer and moving them to the network allows these services to be updated and controlled without interacting with the client computer that will ultimately use the services. However, the client computer must be directed to a network location where a particular service can be accessed.

From a user's perspective, the direction of the client computer may be transparent. For example, the user may click a graphical user interface control such as a button or menu item to access a network hosted service, such as a help menu. However, the application on the computer must target a specific location to access the requested service upon receiving the selection from the user.

The network location for a network hosted service may change from time to time. For example, during application development and subsequent beta testing, the network hosted service may be provided from one network location such as a uniform resource location ("URL") path to a beta server. However, upon releasing the application program, the network hosted services for the program may be provided from a different location, such as a URL path to a production server, such that the selections for a service in an application must target a new network location than was done during the beta testing. Furthermore, the network location for the services may change one or more times, such as to URLs of different production servers, after the application program that utilizes the network services has shipped.

The application of the client computer must be able to access the new network locations as they change with time. To accomplish this, the application may be setup to access a configuration server at a first network location that specifies the network location where a service can be accessed in a file, typically in the extensible markup language ("XML"). The network locations specified by the configuration server can be updated with the new network locations as they occur. Thus, the client computer can then learn to access the services at the new network locations by accessing the configuration server at the known network location.

However, it may often be desirable to direct the client computer to a location other than that specified by the configuration server. For example, a client computer may be a node of a corporate network that provides hosted services in place of hosted services located through the configuration server. Furthermore, certain applications of the client computer may require access to the hosted services located through the configuration server while other applications should access hosted services from another location. The same may be true on a user basis, where services requested by one user through an application should come from the locations specified in the configuration server while services requested by another user through the application should come from different locations than those specified in the configuration server.

SUMMARY

Embodiments of the present invention address these and other problems by providing an override at the client computer. When a hosted service should be accessed from a network location other than that specified at one network location such as a configuration server, then the hosted service can be obtained from a network location specified by the override instead.

One embodiment is a method of directing a client computer to a network location. The method involves, at the client computer, contacting a first network location to obtain a second network location that provides a first service. At the client computer, it is detected whether an override that provides a third network location for the first service is present. When the override is present, then the client computer communicates with the third network location, and when the override is not present, the client computer communicates with the second network location.

Another embodiment is a computer system. The computer system includes a network interface and a processing device. The processing device is configured to execute an operating system providing a system registry. The processing device is also configured to contact a first network location through the network interface to obtain a second network location for a first service. The processing device is further configured to detect whether an override is present in the system registry. The processing device is configured to contact the second network location through the network interface unless the override is present, and if the override is present then contact the third network location through the network interface.

Another embodiment is a computer readable medium. The computer readable medium contains instructions that when executed by a computer perform several steps. The instructions access a store of overrides at the computer that provide network locations for network hosted services and access a first network location to obtain network locations for the network hosted services that do not have an override. The instructions store the network locations provided by the overrides and the network locations obtained from the first network location in memory at the computer, and upon receiving a request at the computer for a network hosted service, the instructions access the memory to determine the network location to contact.

DETAILED DESCRIPTION

Embodiments of the present invention provide for the override of a network location specified for a network hosted service where the override is specified at the client computer. This allows the client computer to be directed to a different network location than may have been initially provided to access the service by providing the override on the client computer. The client computer discovers the override before accessing the network hosted service.

Figure 1:
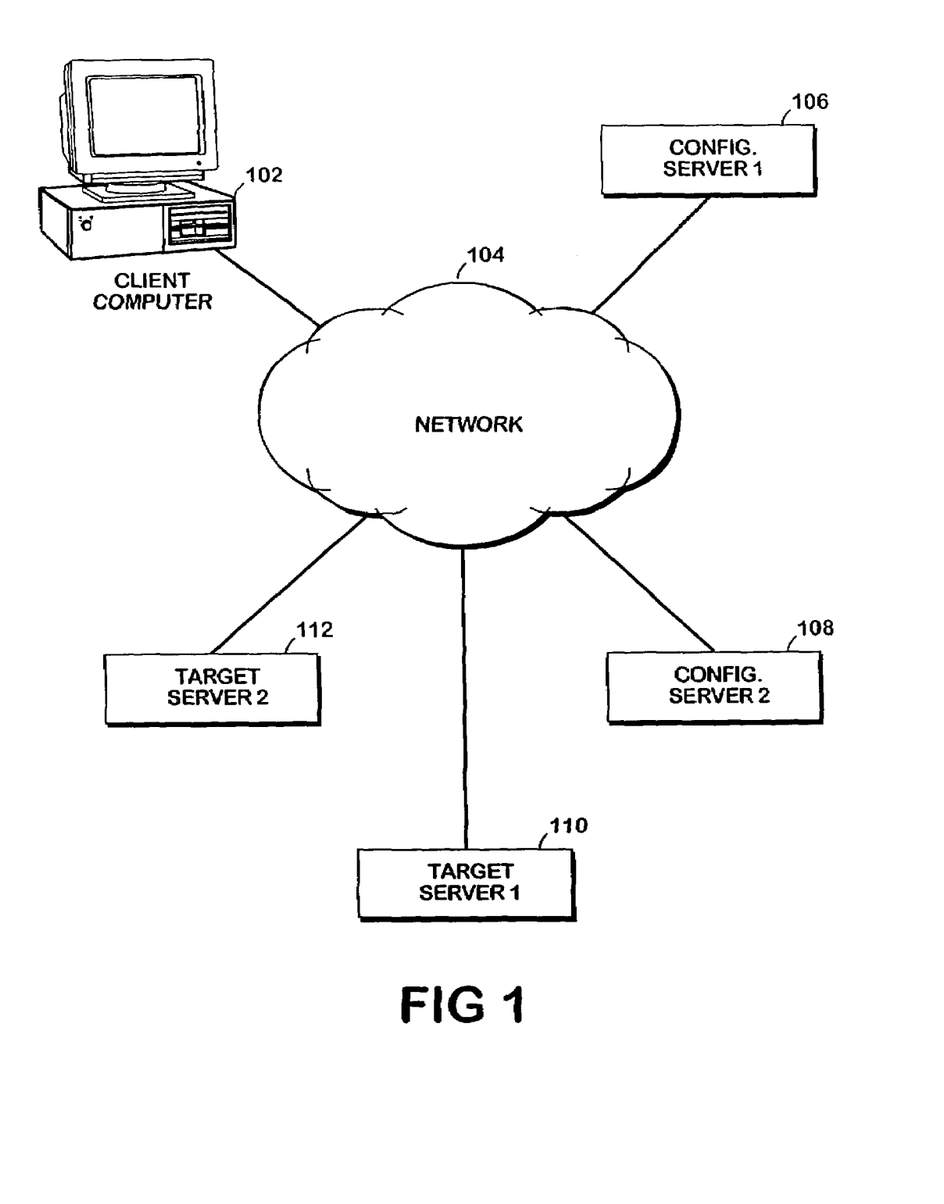
FIG. 1 illustrates a networked operating environment for application of embodiments of the present invention.

FIG. 1 illustrates a typical network environment where embodiments of the present invention may be implemented. The network environment includes a network 104, such as a local area network, wide area network, or the global Internet. The network 104 provides for transporting data via protocols such as but not limited to TCP/IP. Various computers are linked to the network 104 including a client computer 102. The client computer 102 implements one or more application programs that allow a user to access a network hosted service through the network 104.

Various server computers are also linked to the network 104 and are accessible from the client computer 102. A first configuration server 106 is linked to the network 104 and provides configuration files that may be accessed by the client computer 102. The configuration files specify network locations, such as URLs or IP addresses, where the hosted network services may be found. A second configuration server 108 may also be linked to the network 104 to provide alternate configuration files to specify different network locations for hosted services than are provided by the configuration server 106.

Target servers 110 and 112 may also be linked to the network 104. The target servers 110 and 112 provide the network hosted services. Target server 110 has a network location that the client computer 102 may reference to access the network hosted service. Target server 112 has a different network location than target server 110 and may provide an alternate network hosted service to be accessed by the client computer instead of the service provided by target server 110. The configuration file provided by configuration server 106 may provide the network location of the target server 110 for a particular network hosted service while the configuration file provided by the configuration server 108 may provide the network location of the target server 112 for the same network hosted service.

The client computer 102 executes one or more application programs that provide user selectable triggers to access the network hosted services. For example, a graphical user interface may be provided for the client computer 102 and may display buttons, tabs, icons, and other graphical items for selection by the user. Additionally, text based selections may be provided as well, such as hyperlinks within a document. These user selectable triggers cause the client computer 102 to determine where to access the corresponding network hosted service and then to attempt to access the service at the determined location.

The client computer 102 performs various logical operations, discussed in more detail below, to determine where to access the network hosted service. The client computer 102 determines whether there is an override at the configuration server level and/or at the hosted service level. For example, the application of the client computer 102 may have a hard coded address to the configuration server 106 where the client computer 102 should access the configuration file from that specifies the network address for a service. However, an override may be specified at the client computer 102 that directs the client computer to the configuration server 108 to obtain the configuration file that specifies a different network location for the service. As another example, the client computer 102 may have an override specified for a network location of a service such that the client computer 102 does not utilize a network location from the configuration file, regardless of which configuration server it is accessed from.

Figure 2:
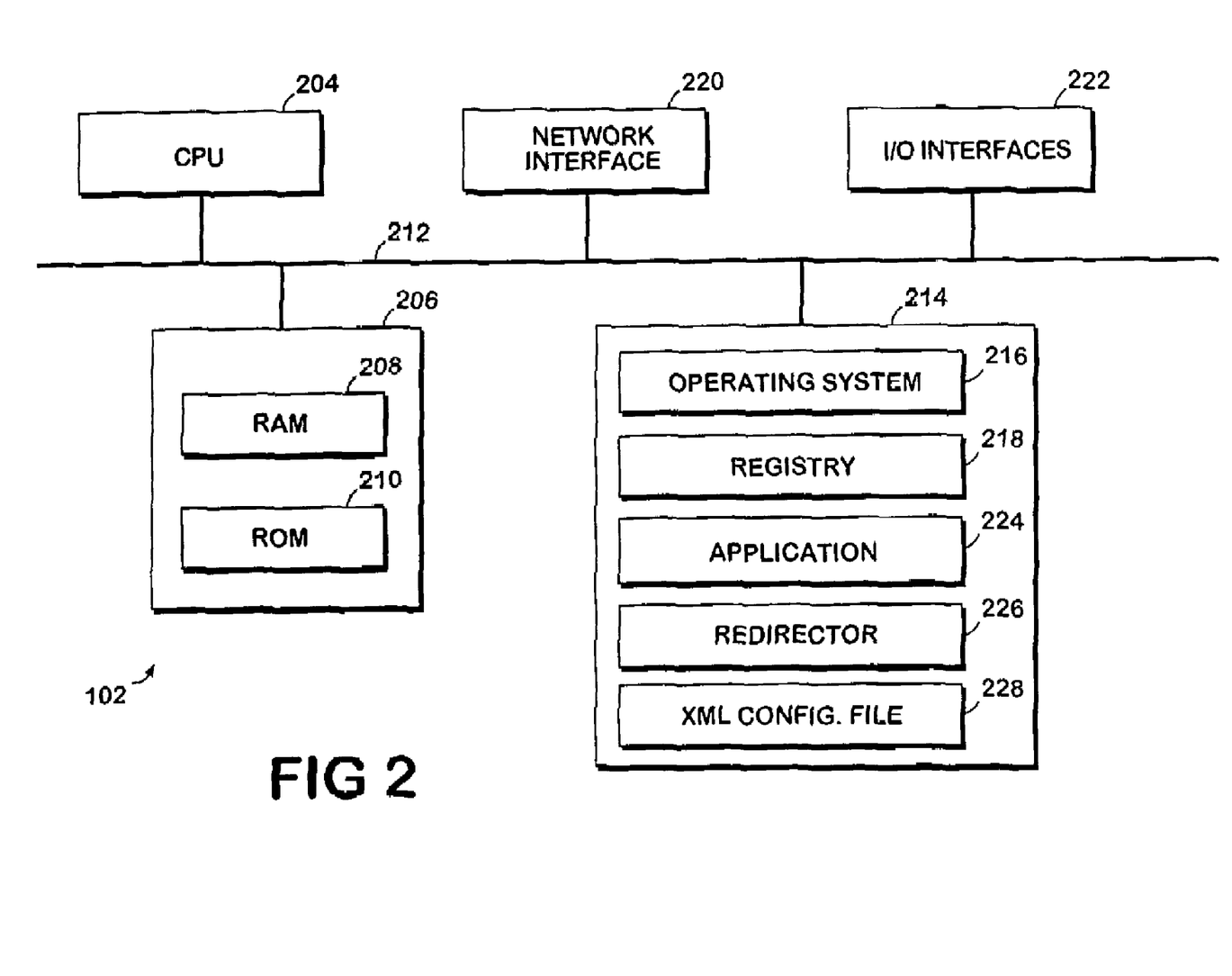
FIG. 2 illustrates the components of a client computer according to embodiments of the present invention.

FIG. 2 and the following discussion are intended to provide a brief, general description of a suitable computing environment in which the invention may be implemented in a client computer 102 to implement the override. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

FIG. 2 shows an illustrative computer architecture for a personal computer 102 for practicing the various embodiments of the invention. The computer architecture shown in FIG. 2 illustrates a conventional personal computer, including a central processing unit 204 ("CPU"), a system memory 206, including a random access memory 208 ("RAM") and a read-only memory ("ROM") 210, and a system bus 212 that couples the memory to the CPU 204. A basic input/output system containing the basic routines that help to transfer information between elements within the computer, such as during startup, is stored in the ROM 210. The personal computer 102 further includes a mass storage device 214 for storing an operating system 216 that provides a system registry 218 and for storing application programs, such as an application program 224 where the network hosted services may be selected. The mass storage device 214 also stores a redirector application 226 that is provided as a component of an application program 224 or as a separate shared code application where multiple application programs can access the same redirector code.

The mass storage device 214 is connected to the CPU 204 through a mass storage controller (not shown) connected to the bus 212. The mass storage device 214 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the personal computer 102 operates in the networked environment of FIG. 1 using logical connections to remote computers through the network 104, such as the Internet. The personal computer 102 may connect to the network 104 through a network interface unit 220 connected to the bus 212. It should be appreciated that the network interface unit 220 may also be utilized to connect to other types of networks and remote computer systems. The personal computer 102 may also include an input/output interface controller 222 for receiving and processing input from a number of devices, including a keyboard or mouse (not shown). Similarly, an input/output interface controller 222 may provide output to a display screen, a printer, or other type of output device.

As mentioned briefly above, a number of program modules and data files may be stored in the mass storage device 214 and RAM 208 of the personal computer 102, including an operating system 216 suitable for controlling the operation of the networked personal computer 102. A system registry 218 may be included to store system specific information utilized by the operating system and application programs. In particular, the system registry 218 may be utilized to store any overrides for network hosted services and the configuration server location. The mass storage device 214 and RAM 208 may also store one or more application programs such as the client application 224 and redirector application 226. Additionally, the mass storage device 214 may contain a copy of the configuration file 228 that has been obtained from a configuration server that specifies network locations for network hosted services.

Embodiments of the present invention provide program modules for use in conjunction with the redirector application program 226. The program modules implement logical operations to determine the network location where the network hosted service selected by the user through the application program 226 should be accessed from. Various embodiments of the logical operations of the program modules for the redirector application 226 are discussed below with reference to FIGS. 4 and 5, while the components that the redirector application 226 communicates with in performing these logical operations are shown in FIG. 3.

Figure 3:
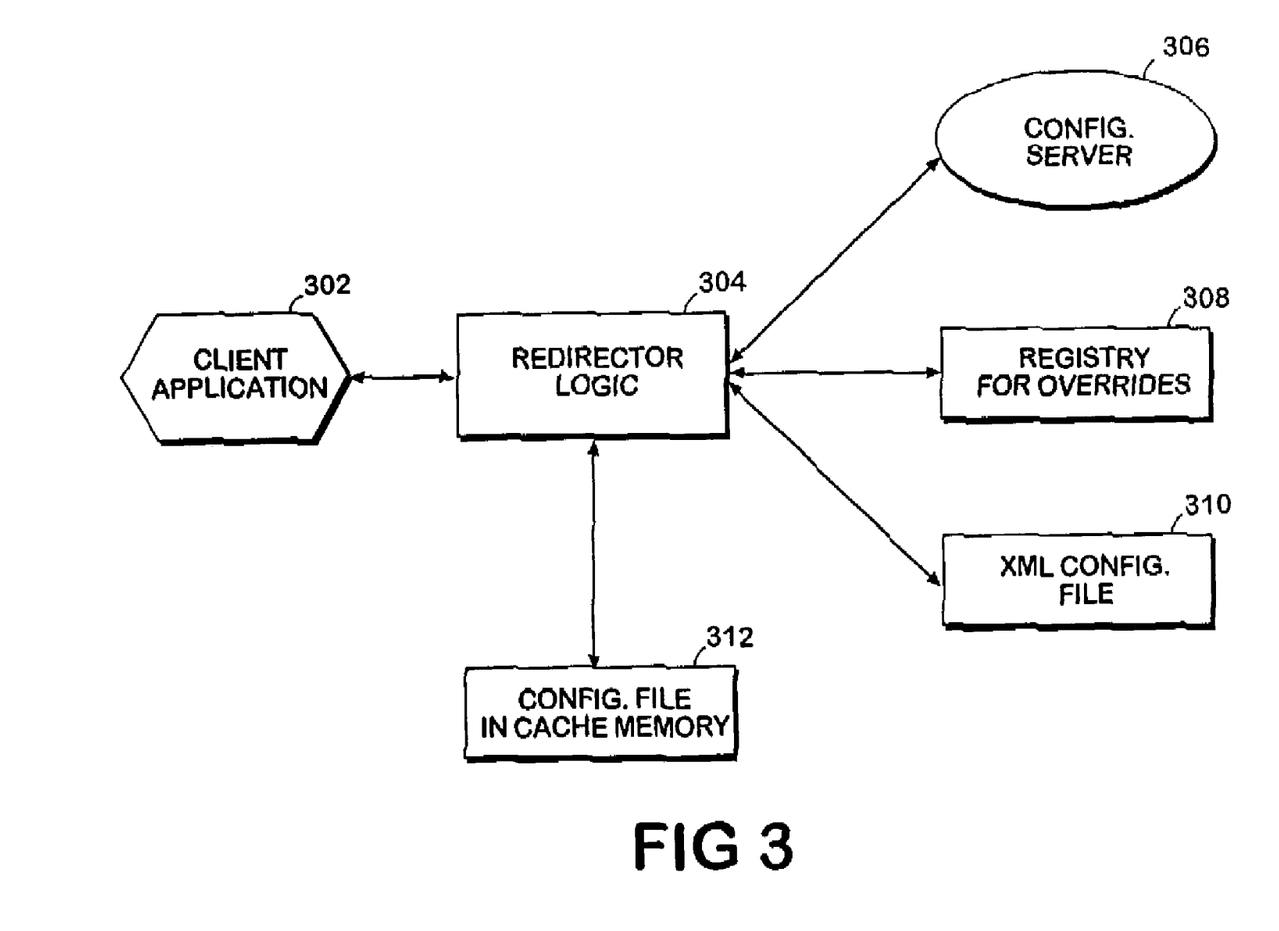
FIG. 3 shows the interaction between the components of the client computer and components of the network according to embodiments of the present invention.

As shown in FIG. 3, a client application 302 initiates action by the redirector application logic 304 upon the user selecting a network hosted service within the client application 302. The redirector logic 304 then communicates with one or more components to determine the network location where the network hosted service should be accessed from. As discussed above, the redirector logic 304 may be incorporated into an application program or may be shared code accessible by a suite of application programs that access network hosted services.

The redirector logic 304 checks the client computer 102 to determine whether any overrides are present, either for the network location of the configuration server or for the network location of the selected network hosted service itself. These overrides are typically stored in the system registry 308 but may be stored at any data storage location of the client computer 102. In certain embodiments, if an override for the service itself is provided, then the redirector logic 304 will provide the network location specified by the override back to the client application 302 so that the service can be accessed without accessing a configuration file. In other embodiments, the redirector logic 304 will access the configuration server 306, which may be the configuration server whose network location is hard coded for the client application 302 or may be a configuration server whose network location is specified by an override discovered by the redirector logic 304.

Upon obtaining a configuration file, the redirector logic 304 creates a stored version 310 of the file in mass storage at the client computer 102 so that the file can be referenced if necessary for subsequent requests for different network hosted services whose network locations are also specified in the configuration file 310. The configuration file 310 is typically written in XML where each service and corresponding network location is identified by or associated with a tag, but the configuration file may be of various other forms as well. This stored version 310 of the configuration information is set to expire after a predetermined time period, prompting the redirector logic 304 to obtain updated information from the configuration server 306.

After storing the configuration file 310, the redirector logic 304 may then begin building a configuration file 312 in RAM. Cache memory, which is a high speed access portion of the RAM system memory, may be used to increase the speed that accesses to the configuration file may be performed. The configuration file 312 may be built by comparing the network location specified in the configuration file 310 to the set of overrides 308. The configuration file 312 results from the redirector logic 304 storing the network location specified by the configuration file 310 when no override is present and otherwise storing the network location provided by the override. The configuration file 312 can then be accessed on subsequent attempts of the client application 302 to access a network hosted service without requiring the redirector logic 304 to again access the overrides 308 and configuration file 310 in mass storage.

Figure 4:
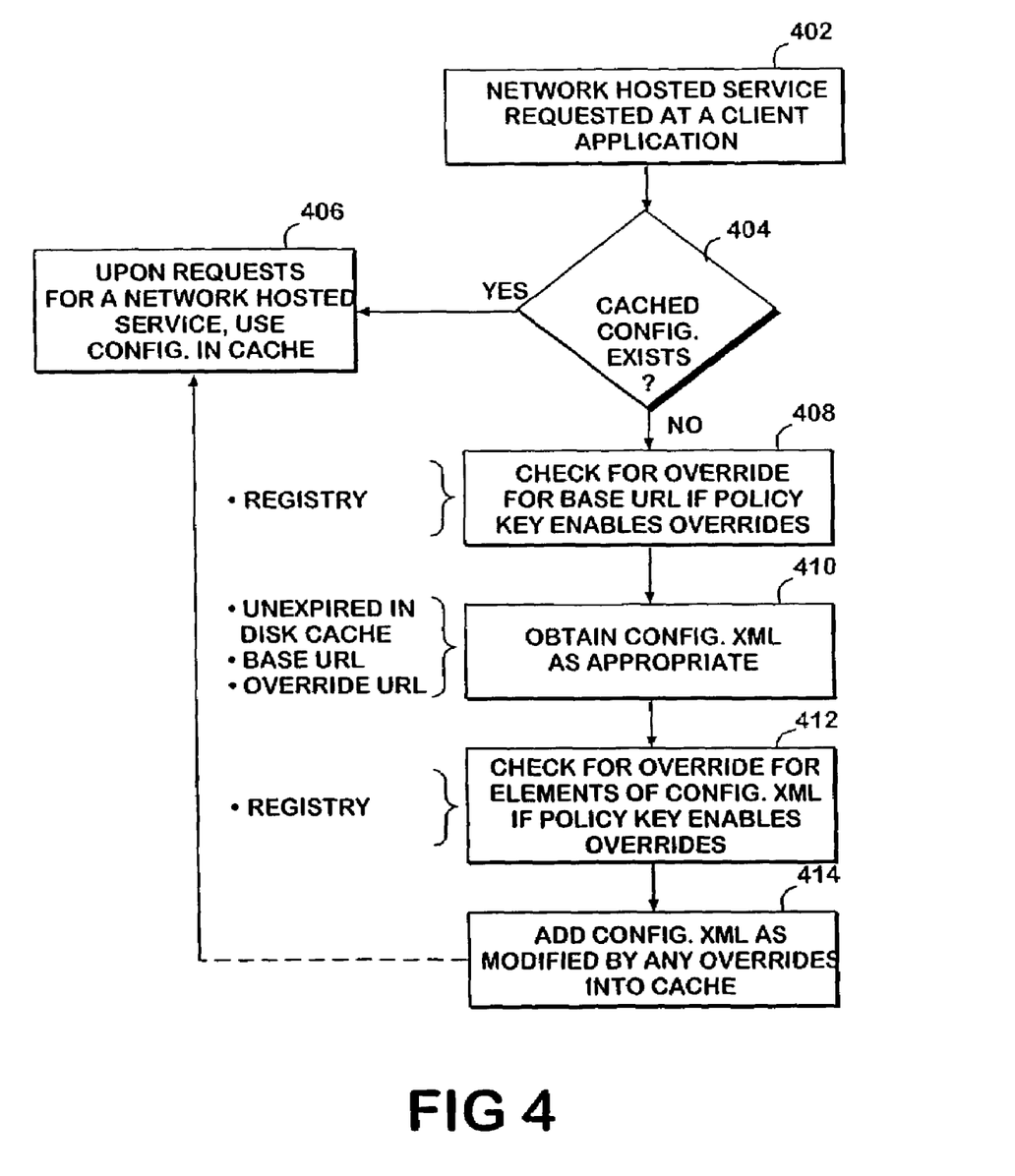
FIG. 4 shows illustrative logical operations performed by the client computer to implement the overrides for the network locations of hosted services.

FIG. 4 shows illustrative logical operations performed by one embodiment of the redirector logic 304 to return the appropriate network location for a hosted service to the client application 302. The logical operations begin by the client application sending a request for a network hosted service location to the redirector 304 at request operation 402. Upon receiving the request, the redirector 304 detects whether a cached configuration file 312 already exists in RAM at query operation 404. Typically, the configuration file 312 is saved in RAM on a per application session basis so that it may not exist for this particular application but may exist in RAM for a different application. If the configuration file 312 relevant to the client application 302 does exist, then the network location specified in the cached configuration file 312 is provided to the client application 302 for the hosted service at cache operation 406.

If query operation 404 detects that the cached configuration file 312 does not exist, then operational flow transitions to override operation 408. In an alternative embodiment, the redirector 304 may directly check for an override for the requested service at this point. If an override is present, then the network location of the override may then be provided to the client application 302 to access the hosted service. This reduces the delay in accessing the hosted service that might otherwise occur if the redirector 304 must access a configuration server before checking for the override. In the embodiment shown in FIG. 4, the redirector 304 accesses the store of overrides to determine whether the base URL, which is the URL or other network location hard coded for a configuration server, has an override at override operation 408. In certain embodiments, the redirector 304 accesses the store of overrides in the system registry 308. However, it will be appreciated that the store of overrides may be located somewhere other than within the system registry 308 so long as the redirector 304 can access the overrides. Additional logical operations of the override operation 408 are described in more detail below with reference to FIG. 5.

In one embodiment, override operation 408 may check for an override to the base URL only upon checking a policy key stored in the registry or elsewhere that enables and disables overrides, which can be controlled by a system administrator of a network. The policy key that is controlled by a system administrator provides an additional security mechanism to prevent unintended overrides from being provided to the client application 302 by the redirector 304.

After checking for an override for the base URL at override operation 408, the redirector 304 obtains the configuration file at file operation 410. The configuration file 310 may be cached in the mass storage on the client computer such that the redirector 304 can simply obtain the configuration file 310 from mass storage if this cached configuration file 310 has not expired or is not subject to an override found at override operation 408. If the appropriate configuration file is not available from disk cache, then the redirector 304 accesses the configuration server 306 specified by the base URL or the override if present to obtain the appropriate configuration file. In certain embodiments, security checks may be performed upon obtaining and using the configuration file 310 from one of these locations. For example, a digital signature for the configuration file 310 may be verified at this time to determine whether the configuration file should be trusted and saved for use, or distrusted and discarded. For example, where the configuration file 310 has been cached to the local drive, it may have been manipulated so a security check such as review of a digital signature may be performed each time it is accessed to verify that it remains trustworthy.

After obtaining and placing the configuration file 310 into storage, the redirector 304 checks for overrides for the network locations specified in the configuration file for the various network hosted services at override operation 412. In one embodiment, override operation 412 may check for overrides only upon checking a policy key in the registry or elsewhere that enables and disables the overrides, which can be controlled by a system administrator of a network. As discussed above, the overrides may be stored in the system registry or in another storage location accessible by the redirector 304. Additional logical operations of the override operation 412 are discussed in more detail below with reference to FIG. 5.

Once the redirector 304 has discovered the overrides that are present relative to the network locations specified in the configuration file 310, the redirector 304 builds the configuration file 312 in RAM at file operation 414 by loading the network locations for services as specified in the configuration file 310 but as modified by the discovered overrides. Then, the redirector 304 provides the network address specified in the configuration file 312 in RAM for the requested service to the client application at cache operation 406 so that the service can be accessed from the appropriate network location.

Figure 5:
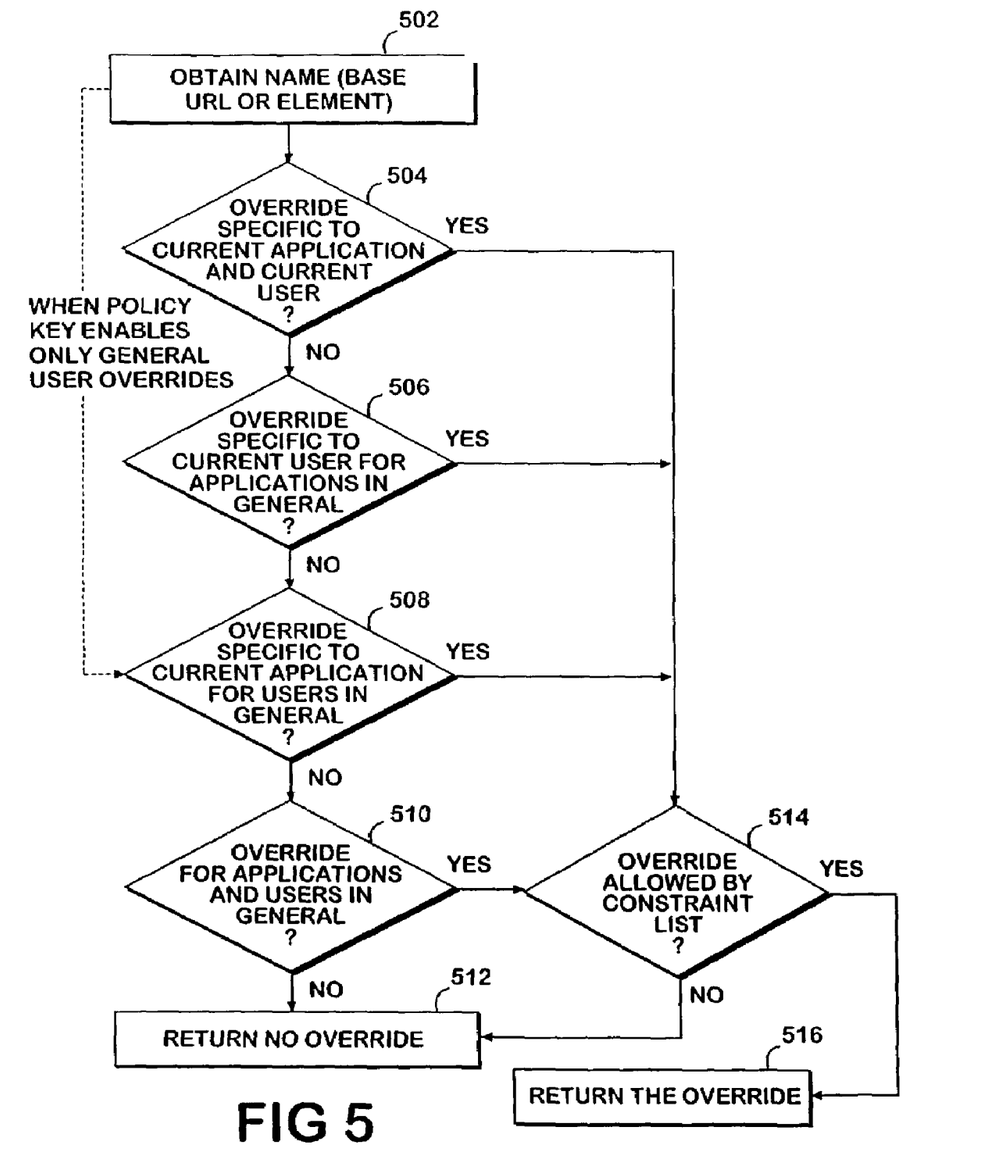
FIG. 5 shows illustrative logical sub-operations of the override operation of FIG. 4.

FIG. 5 shows the illustrative logical operations that occur for override operation 408 and/or override operation 412 of FIG. 4 according to the embodiment shown. For embodiments where a policy key is used to enable and disable overrides, the logical operations of FIG. 5 are performed only when overrides for the elements of the config. file or the base URL are enabled by the policy key to some degree. The logical operations of FIG. 5 provide various query operations that serve to filter the overrides that may be present for a service or base URL. It will be appreciated that some, all, or none of these filters may be used in various embodiments for the configuration server override, for the hosted service overrides, or for both.

The logical operations begin at name operation 502 where the redirector 304 obtains a name to consider, which may be the base URL for the configuration server or the name of the hosted service being considered. Where the logical operations of FIG. 5 correspond to the override operation 408, then name operation 502 obtains the base URL. Where the logical operations correspond to override operation 412, then name operation 502 obtains the hosted service name being considered. In one embodiment, the policy key stored in the registry or elsewhere may specify that overrides for an element and/or the base URL is available only for users in general such that overrides that are present and are specifically for a particular user are not allowed. In this embodiment, operational flow may proceed directly to query operation 508 to detect whether an override specific to the current application is provided, as discussed below, thereby skipping query operations 504 and 506 since overrides specific to the current user will not be used. If the policy key specifies that overrides for the current user may be used as well, then operational flow proceeds to query operation 504.

When operational flow transitions to query operation 504, the redirector 304 detects whether an override specific to the current client application and the current user is available for a service or base URL. The override may provide information including which users and which client applications the override applies to so that the redirector 304 can make determinations about whether the override is to be used based on the client application and current user. If query operation detects that there is an override that is specific to the current application and current user, then operational flow proceeds to query operation 514. If not, operational flow transitions to query operation 506.

At query operation 506, the redirector 304 detects whether an override specific to the current user but for applications in general is available for a hosted service or base URL. For example, there may be a hosted service utilized by many applications that is pertinent to or customized for a specific user. If query operation 506 detects that such an override is available, then operational flow transitions to query operation 514. If query operation 506 does not find such an override, then query operation 508 detects whether there is an override specific to the current application but for users in general for a service or base URL. If so, then operational flow transitions to query operation 514. Otherwise, query operation 510 detects whether there is an override for applications and users in general for a service or base URL. If there is, then operational flow transitions to query operation 514, and otherwise operational flow transitions to return operation 512 where no override is returned for use by the redirector 304.

When operational flow transitions to query operation 514, then the redirector 304 detects whether the override that has been obtained provides a network location that is allowed by a constraint list. The constraint list is a list of valid network locations where the client application 302 can visit to access the network hosted services and/or configuration files. The constraint list may also be stored in the system registry of the client computer or at another storage location that is accessible by the redirector 304. The constraint list prevents an override to an inappropriate network location from being stored on the client computer. If query operation 514 detects that the network location of the override is not on the list, then return operation 512 provides no override for the redirector 304. If query operation 514 detects that the network location is on the constraint list, then return operation 516 provides the override for subsequent use by the redirector 304 to direct the client application.

Thus, by providing the overrides that can be discovered by the redirector, the client computer can be directed to various network locations to obtain network hosted services. For example, a corporate network may provide customized hosted services for client computers. The corporate network administrator may then have the overrides sent to and stored at the client computers upon log in of the client computers via network profiles set up by the administrator. The administrator can later remove or modify the overrides as necessary via a change to the profiles for the users. Alternatively, overrides can be manually entered and modified by a user of the client computer.

While the invention has been particularly shown and described with reference to illustrative embodiments thereof, it will be understood by those skilled in the art that various other changes in the form and details may be made therein without departing from the spirit and scope of the invention.

What is claimed is:

1. A method of directing a client computer to a network location, comprising:
    at the client computer, contacting a first network location associated with a configuration server to obtain configuration files that identify an address of a second network location that provides a first service, wherein the configuration files are mark-up language files that identify the address of the second network location that provides the first service;
    storing the obtained configuration files on the client computer;
    generating a built configuration file on the client computer, wherein generating the built configuration file on the client computer includes:
    detecting whether an override address that is stored in a system registry on the client computer is present, wherein the override address provides an address for a third network location for the first service, wherein detecting whether an override address is present further comprises performing various logical operations that filter the overrides and determines whether an override address is present for at least one member of a group comprising: a current application and a current user, a current user for applications in general, a current applications for users in general, and applications and users in general;
    comparing the third network location to a list of valid network locations;
    storing the override address in the built configuration file when the override address is stored on the client computer and is included in the list of valid network locations;
    storing the address of the second network location of the obtained configuration file when the override address is at least one member of a group comprising: not stored on the client computer and not included in the list of valid network locations;
    receiving, on the client computer, a request for the first service; and
    accessing the built configuration file, wherein the built configuration file causes the client to communicate with the third network location, when the override address is stored in the built configuration file, and wherein the built configuration file causes the client to communicate with the second network location, when the address of the second network location is stored in the built configuration file.

2. The method of claim 1, wherein contacting a first network location to obtain an address for a second network location is performed by the client computer only when the override is not present.

3. The method of claim 1, wherein contacting a first network location, detecting whether an override is present, communicating with the second network location when the override is not present, and communicating with the third network location when the override is present is performed by the client computer in response to a user selection for the first service occurring at the client computer.

4. The method of claim 1, wherein the built configuration file is loaded into cache memory at the client computer.

5. The method of claim 4, wherein upon attempting to access the first service, the method further comprises referencing the cache memory at the client computer to determine whether to communicate with one member of a group comprising: the second network location and the third network location.

6. A computer system, comprising:
    a network interface; and
    a processing device configured to:
        execute an operating system providing a system registry;
    contact a first network location associated with a configuration server through the network interface to obtain configuration files that identify an address for a second network location for the first service;
    store the obtained configuration files on the client computer;
    generate a built configuration file on the client computer, wherein generating the built configuration file on the client computer includes detecting whether an override address is present in the system registry, wherein detecting whether an override address is present further comprises performing various logical operations that filter the overrides and determines whether an override address is present for at least one member of a group comprising: a current application and a current user, a current user for applications in general, a current applications for users in general, and applications and users in general, wherein the override address provides an address for a third network location for the first service, storing the override address in the built configuration file when the override address is present in the system registry, storing the address of the second network location of the obtained configuration file when the override address is not present in the system registry;

receive, on the client computer, a request for the first service;

access the built configuration file, wherein the built configuration file causes the client to communicate with the third network location, when the override address is stored in the built configuration file, and wherein the built configuration file causes the client to communicate with the second network location, when the address of the second network location is stored in the built configuration file.

7. The computer system of claim 6, wherein the obtained configuration file includes an XML file specifying an address for at least one network location, wherein the at least one network location comprises the second network location.

8. The computer system of claim 6, wherein the processing device is further configured to compare the address for the third network location to a list of valid network locations and communicate with the third network location only when the third network location is included in the list of valid network locations.

9. The computer system of claim 8, further comprising communicating with the second network location when the third network location is not included in the list of valid network locations.

10. The computer system of claim 6, wherein the processing device is configured to contact a first network location to obtain an address for a second network location only when the override address is not present.

11. The computer system of claim 6, wherein the processing device is configured to contact a first network location, detect whether an override address is present, and communicate with the second network location when the override address is not present and communicate with the third network location when the override address is present in response to a user selection for the first service.

12. The computer system of claim 6, wherein the built configuration file is loaded into a cache memory at the client.

13. The computer system of claim 12, wherein upon attempts by the processing device to access the first service, the processing device references the cache memory to determine whether to communicate with the second network location or the third network location.

14. A computer readable storage medium having instructions that when executed by a computer perform the steps of:
at the client computer, accessing a first network location associated with a configuration server to obtain configuration files that identify an address for a second network location for a network hosted service that does not have an override address
storing the obtained configuration files on the client computer;
generating a built configuration file on the client computer, wherein generating the built configuration file on the client computer includes;

detecting whether an override address that is stored in a system registry on the client computer is present, wherein the override address provides an address for a third network location for the first service, wherein detecting whether an override address is present further comprises performing various logical operations that filter the overrides and determines whether an override address is present for at least one member of a group comprising: a current application and a current user, a current user for applications in general, a current applications for users in general, and applications and users in general;

comparing the third network location to a list of valid network locations;

storing the override address in the built configuration file when the override address is stored on the client computer and is included in the list of valid network locations;

storing the address of the second network location of the obtained configuration file when the override address is at least one member of a group comprising: not stored on the client computer and not included in the list of valid network locations;

receiving, on the client computer, a request for the first service; and accessing the built configuration file, wherein the built configuration file causes the client to communicate with the third network location, when the override address is stored in the built configuration file, and wherein the built configuration file causes the client to communicate with the second network location, when the address of the second network location is stored in the built configuration file.

15. The computer readable storage medium of claim 14, wherein the store is a system registry provided by an operating system being executed by the computer.

16. The computer readable storage medium of claim 14, wherein accessing the first network address comprises:
obtaining an XML file from the first network address at a first time;
at a later time, determining whether the XML file has expired;
obtaining a new XML file from the first network location to obtain the network locations for the network hosted services not having an override from the new XML file when the XML file has expired; and
obtaining the network locations for the network hosted services not having an override address from the XML file when the XML file has not expired.

* * * * *